United States Patent [19]

Hauptmann et al.

[11] Patent Number: 5,001,088
[45] Date of Patent: Mar. 19, 1991

[54] METHOD FOR PRODUCING POROUS FORM BODIES

[75] Inventors: Holger Hauptmann, Karlsfeld; Gerhard Andrees, Munich, both of Fed. Rep. of Germany

[73] Assignee: MTU Motoren-und Turbinen-Union, Munich, Fed. Rep. of Germany

[21] Appl. No.: 262,479

[22] Filed: Oct. 25, 1988

[30] Foreign Application Priority Data

Oct. 29, 1987 [DE] Fed. Rep. of Germany ....... 3736660

[51] Int. Cl.$^5$ ............................................. C04B 35/56
[52] U.S. Cl. ....................................... 501/90; 501/81; 501/82; 501/83; 501/89; 264/43; 264/44
[58] Field of Search ....................... 501/81, 83, 89, 90, 501/82; 264/43, 44

[56] References Cited

U.S. PATENT DOCUMENTS

| | | |
|---|---|---|
| 4,124,667 | 11/1978 | Coppola et al. ...................... 501/90 |
| 4,522,744 | 6/1985 | Argall et al. ........................... 264/44 |
| 4,525,461 | 1/1985 | Boecker et al. ........................ 501/90 |
| 4,551,436 | 11/1985 | Johnson et al. ........................ 501/90 |

FOREIGN PATENT DOCUMENTS

| | | | |
|---|---|---|---|
| 59-8668 | 1/1984 | Japan ...................................... 501/90 |
| 60-255681 | 12/1985 | Japan ...................................... 264/44 |
| 7607252 | 1/1977 | Netherlands ............................ 501/89 |

Primary Examiner—William R. Dixon, Jr.
Assistant Examiner—David M. Brunsman
Attorney, Agent, or Firm—W. G. Fasse; D. H. Kane, Jr.

[57] ABSTRACT

A porous form body is produced of sinterable SiC-powder by forming a suitable suspension of said SiC-powder and then treating the suspension to convert it into droplets and the droplets into a granular material in which the granules are substantially larger than the particles of SiC-powder. The granular material is then formed into a green body, e.g. by spraying the granules onto a negative mold of the form body or slip-casting or the like. The green body is then sintered whereby the resulting porosity in the final form body provides the form body with low drag.

22 Claims, 1 Drawing Sheet

METHOD FOR THE PREPARATION OF HALOPHTHALIC ANHYDRIDES

BACKGROUND OF THE INVENTION

This application is a continuation-in-part application of copending applications Ser. No. 160,033 for "Improved Dehydrogenation Procedure": and application Ser. No. 160,034 for "Selective Dehydrogenation with Chlorine," both now abandoned, both filed Feb. 24, 1988.

This invention relates to a process for the aromatization of a cyclic compound to form a fully aromatic ring structure. More particularly, it relates to a process for producing a halogen substituted phthalic anhydride from a halogen substituted saturated or partially saturated phthalic anhydride.

Substituted phthalic anhydrides are valuable raw materials for the synthesis of a variety of useful products. Halophthalic anhydrides are utilized as intermediates in the synthesis of organic polymers, dyes, plasticizers and in other uses.

The preparation of tetrahydrophthalic anhydrides and aromatization thereof by dehydrogenation under various conditions is known in the chemical literature. Skvarchenko et al., Obshchei Khimii, Vol. 30, No. 11. pp. 3535-3541 disclose the aromatization of chloro-substituted tetrahydrophthalic anhydride by heating with phosphorus pentoxide. In the aromatization process described, however, decarboxylation also occurs with the formation of the corresponding chloro-substituted benzene compound. The preparation of various other tetrahydrophthalic acids and anhydrides and various methods for dehydrogenation and aromatization thereof are reviewed by Skvarchenko in Russian Chemical Review. No. 1963, pp. 571-589.

U.S. Pat. No. 4,560,772 to Telschow discloses the reaction of 4-methyltetrahydrophthalic anhydride with excess sulfur and a catalytic amount of zinc oxide and 2-mercaptobenzothiazole to produce 4-methylphthalic anhydride and hydrogen sulfide.

U.S. Pat. No. 4,560,773 to Telschow discloses a similar reaction between the electron rich 4-methyltetrahydrophthalic anhydride and bromine in the presence of a catalytic amount of an acid acceptor such as dimethylformamide or pyridine in the liquid phase.

U.S. Pat. No. 4,517,372 to Tang, disclosed a process for the preparation of 4-fluorophthalic anhydride by dehydrogenation of gem-, difluoro- or gem-chlorofluoro- hexahydrophthalic anhydrides in the presence of a dehydrogenation catalyst such as palladium on carbon.

U.S. Pat. No. 4,709,056 to Cotter, Lin, and Pawlak discloses the preparation of 4,4-difluorohexahydrophthalic anhydride and 4-chloro-4-fluorohexahydrophthalic anhydrides by reaction of hydrogen fluorides with 4-chlorotetrahydrophthalic anhydride.

Ohkatou et al., J. Japan Petrol. Inst.. 22, 164-9 (1979) disclose the dehydrogenation of hydrocarbons using an activated carbon bed to produce the corresponding olefins. The mechanism of the reaction using cyclohexane and cyclohexene were studied using a pressure flow technique.

Bergmann J. Amer. Chem. Soc. 64, 176 (1942) discloses the aromatization of tetrahydrophthalic anhydride products of Diels-Alder reactions. The author discloses that dehydrogenation occurred when the tetrahydrophthalic anhydride product is boiled in nitrobenzene. However, it is further disclosed that dehydrogenation does not occur when p-bromonitrobenzene, p-chloronitrobenzene, or m-dinitrobenzene in xylene is employed. Moreover, it has been found that when the dihalohexahydrophthalic anhydrides of this publication are dehydrogenated in nitrobenzene, a portion of the nitrobenzene is reduced to aniline. The aniline reacts with the anhydride group of either the starting material or product to form imides and thus lower the yield of desired product.

SUMMARY OF THE INVENTION

In accordance with the present invention there is provided a process for the preparation of halogen substituted phthalic anhydrides of the formula

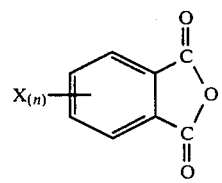

wherein each X is independently F—, Cl—, Br—, or I—, and n is 1 or 2, which comprises reacting chlorine with a halogen substituted hexa-, or tetra-hydrophthalic phthalic anhydride reactant of the formula

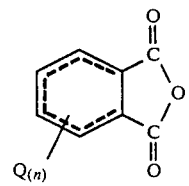

wherein Q is monohalo and is the same as X or is gem-dihalo, wherein at least one halogen is the same as X, and n is the same number as in formula I, with the proviso that each monohalo is directly attached to a double bond carbon and each gem-dihalo is directly attached to a non-double bond carbon, in liquid or vapor phase, at a temperature of 200°-500° C.

The structural formula

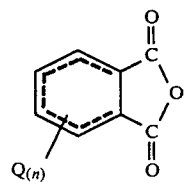

as employed herein represents saturated and partially saturated halo-phthalic anhydrides, including halotetrahydrophthalic anhydrides such as those of the formulae

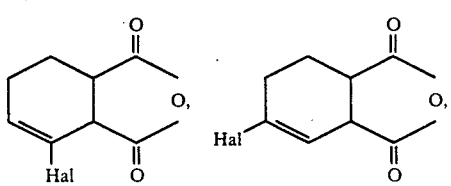

Still another advantage of the form bodies according to the invention is seen in that their temperature resistance, especially at temperature fluctuations within a wide range, can be controlled by controlling the porosity. It has been found that a porosity of about 20% by volume of the total volume of the form body provides the required high temperature resistance. Thus, the present form bodies can be used for constructing combustion chamber walls, whereby it is possible to cover the internal wall surfaces with so-called fine layers of sintered material having a high density.

BRIEF DESCRIPTION OF THE DRAWINGS

In order that the invention may be clearly understood, it will now be described, by way of example, with reference to the accompanying drawings, wherein.

Figure 1:
FIG. 1 is a photograph of a portion of a form body in the form of a cylinder produced according to the invention, whereby the photograph was taken at a magnification of 20.

DETAILED DESCRIPTION OF PREFERRED EXAMPLE EMBODIMENTS AND OF THE BEST MODE OF THE INVENTION

Referring first to the drawings, it is apparent that the granular material produced according to the invention has granules with a substantially spherical or globular configuration. These globules of silicon carbide are bonded to each other at their surface contact points, by the sintering while simultaneously forming an interlinked network of hollow spaces or large pores as best seen from FIGS. 2 and 3. Especially, in FIG. 3 the hollow interlinked ducts or channels are well visible as dark areas. It has been found that these channels have a relatively small flow drag. The porosity of the cylinder wall permits a gas flow through the porous cylinder wall of 7 liters/cm$^2$ of wall surface per minute with a pressure differential across the cylinder wall of 100 millibar.

According to one embodiment of the invention sinterable or sinter-active silicon carbide powder having a specific surface area of 10 to 50 m$^2$/g is suspended in a solvent together with a bonding agent. The powder particles are conventionally smaller than 10 micron. A source of free carbon is added to the silicon powder in a quantity of 0.5 to 5% by weight. The purpose of the addition of free carbon is to reduce any formation of SiO$_2$ glass layers by the formation of carbon oxides. The bonding agent is introduced into the slurry for controlling the formation of the globular granules. The function of the additives boron and/or aluminum is their enhancement of the subsequent sintering process. The powder is introduced into water or alcohol or a mixture of water and alcohol with other organic solvents for forming a slurry or suspension. The solvent is selected with a view to its ability to easily evaporate under vacuum or under the influence of heat. Binder agents or bonding agents are added to the solvent. Such bonding agents include phenolic resins or polyvinyl alcohols. The bonding agents make sure that any drying subsequent to the comminution, for example by spraying, will not cause the globular granules to return back to the particle size of the silicon carbide powder. Various bonding agents may be used according to the invention. Rapidly reacting multicomponent resins have been found to be suitable for the present purposes. These resins have the added advantage that they simultaneously form a source for the free carbon said binding or bonding agents also include a parting or mold release agent.

The so formed suspension or slurry is then sprayed through spray nozzles to convert the suspension into droplets which are dried on their surface as they are being formed. The drying takes place either by blowing the droplets into a hot gas atmosphere or by irradiating the droplet spray with an infrared or microwave radiation to heat the droplets for evaporating at least a portion of the solvent to solidify the outer contour of the droplets to form granules. Both mentioned drying methods can be used in combination. In any event, the droplets are stabilized in their substantially spherical configuration. Stated differently, when the partially dried droplets contact a surface, they do not change their substantially spherical shape. The temperature and duration of drying are dependent on the shape and size of the formed bodies and of the used drying method.

In one embodiment of the invention a green body is formed by introducing a negative mold of the form body into the jet mist at a point where the droplets have been sufficiently dried to form particles that will adhere to the surface of the negative mold which is then uniformly coated to form the desired wall thickness. Preferably, the negative mold is preheated in order to enhance the drying process. Additionally, the negative mold is moved in the spray mist of drying droplets so as to form a uniform layer on the negative mold, especially a layer of uniform thickness. Due to the liquid removal from the droplets as a result of the drying, the viscosity is increased to such an extent that the resulting granules substantially retain their substantially spherical shape while still being able to intimately bond to other granules when they contact each other to form the green body. An advantage of the invention is seen in that the size of the droplets and thus of the granules can be controlled by controlling the viscosity of the suspension or slurry, by controlling the solid component content in the slurry, by controlling the spraying pressure and/or the nozzle size, whereby these factors can be modified within wide ranges to be ascertained by simple experiment. Another advantage is that modifying these control factors also controls the size of the pores as well as their distribution so that a more or less porous structure can be formed in the final form body having the desired total pore volume and pore size.

When the layer formation is completed on the negative mold the drying is continued until the green body has a sufficient dimensional stability for removal from the negative mold and for introduction into the sintering process.

According to another embodiment of the invention, the granular material obtained as described above may be converted into a deformable material by adding a plastifier. Incidentally, the quantity of aluminum and/or bore additives may be in the range of 0.1 to 1.5% by weight and the bonding components shall be such that in the following production steps the bonding agents shall not go into solution, nor shall they soften, nor shall they swell. Further, the bonding system or agents must assure that the granular material will assume a sufficient form stability by the application of pressure when the green body is formed. Phenolic resins or polyvinyl alcohols are especially suitable for the bonding agents.

pressures may be employed, but are not generally preferred.

A solvent can be used in the reaction, but is generally not preferred. When a solvent is used, the anhydride reactant is dissolved in the solvent prior to introduction of the material to the reactor. In the vapor phase reaction, a lower boiling solvent is preferred, such as toluene or vinyl acetate. In the melt or liquid phase reaction, a higher boiling solvent such as 1,2,4-trichlorobenzene is preferred.

Advantageously, in a preferred embodiment, an activated carbon catalyst may be employed. A wide variety of activated carbon catalysts that may be employed in the present process are available commercially. Suitable catalysts include, for example, granular activated charcoals, such as those available from Calgon Corporation, Pittsburgh, Pa., designated Calgon F-300 (coal based); Calgon PCB (coconut-shell based); Calgon APC (coal bases); Norit MRX (peat based) and Norit KB activated carbon (peat based) available from American Norit Company, Jacksonville, Fla.; Carborundum GAC 40; Aldrich activated Carbon (Cat. No. 24,223-3) available from Aldrich Chemical Co., Milwaukee, Wis., or similar granular forms suitable for passing organic vapors through them. Alternatively, powdered forms of activated charcoal may be used. In a liquid phase process the activated carbon may be mixed with the liquid anhydride reactant. In the vapor phase process the mixture of gaseous and vapor reactants may be passed through a bed of the activated carbon particles.

The following specific examples are provided to further illustrate this invention and the manner in which it may be carried out. It will be understood, however, that the specific details given in the examples have been chosen for purposes of illustration and are not to be construed as a limitation on the invention. In the examples, unless otherwise indicated, all parts and percentages are by weight and all temperatures are in degrees Celsius.

EXAMPLE I

A U-shaped nickel reactor tube, $\frac{3}{4}$ inch inside diameter and 6 inches long on each side (an inlet side and an outlet side), was wrapped with heating tapes. A quantity of nickel mesh was placed within the outlet leg or side to increase the surface area and facilitate mixing of gaseous reactants. The inlet contained two openings; one for the chlorine feed and the second for the raw material feed. The outlet side of the reactor tube was connected to a series of receivers and traps to collect the product and entrap the acid side product. A quantity of 4-chlorotetrahydrophthalic anhydride was placed in a flask and heated, the melted material was transferred, in a steady flow by means of a pump, through heated lines to the inlet of the reactor tube. A flow of dry nitrogen was used to assist in the passage of materials through the reactor (20 ml/mm). The raw material was vaporized at 255° C. The reactor temperature was 240° to 300° C. Chlorine flow was 230 ml/min, and the organic flow was 0.15 grams/minute. The ratio of the flow of chlorine and the flow of organic were set at 2.5 moles of chlorine per mole of organic. The reaction was conducted under these temperatures and conditions and a product of 4-chlorophthalic anhydride was obtained at a 50% yield.

EXAMPLE II

To a three necked 50 ml round bottom flask, fitted with a stirrer, gas inlet tube and connected to a trap system, for recovery of products, was placed 20.38 g of 4-chloro-1,2,3,6-tetrahydrophthalic anhydride. The reactor was heated to 200° C. and illuminated with a 15 watt black, blue bulb (GE F15T8-BLB) with a transmission range of 300-400 nm and a maximum at 375 nm. An excess flow of chlorine was begun and the reaction continued for 8 hours. The reactor was purged with nitrogen and sampled. A 12% yield of 4-chlorophthalic anhydride was obtained.

EXAMPLE III

A U-shaped nickel reactor tube, 1 inch inside diameter and 30 inches long on each side, was wrapped with heating tapes. The input leg is used as the vaporizer; the outlet leg of the tube served as the reaction zone and was packed with 146 grams of activated carbon (Calgon F-300 manufactured by Calgon Corporation, Pittsburgh, Pa.). Reaction temperature was monitored by means of thermocouples and placed within the carbon bed. At the feed end of the U-shaped reaction tube were openings for the chlorine gas feed and for the anhydride reactant feed. The outlet of the reactor was connected to a series of receivers and traps to collect the product and entrap the anhydrous HCl produced. Liquid 4-chlorotetraphthalic anhydride was transferred, in a steady flow by means of a pump, through heated lines to the inlet of the reactor tube. Prior to starting, the pressure was reduced to 50 mm of Hg to lower the temperature of vaporization. The raw material was vaporized at 250° C. The reaction temperature was 240° to 250° C. Chlorine flow was 230 ml/min, and the organic flow was 0.67 grams/minute. The ratio of the flow of chlorine and the flow of organic was set at 2 moles of chlorine per mole of organic. The reaction was conducted under these temperatures and conditions and a product of 4-chlorophthalic anhydride was obtained at an 80% yield and 90% purity.

EXAMPLE IV

A mixture of 20 grams of 4-chlorotetrahydrophthalic anhydride and 5 grams of activated carbon, (NORIT KB) was placed in a reaction vessel containing a gas inlet tube, a stirrer and condenser and an outlet connected to a trap. The reactor was heated to 250° C. and a continuous flow of chlorine gas was passed through the liquid for 1.5 hours. Product began to collect in the trap, the temperature was reduced to 200° C., and stirring was continued for an additional hour. The yield of 4-chlorophthalic anhydride was 60% and analysis of the reaction mixture showed no starting material being present. The purity of the product was 60%.

EXAMPLE V

The procedure of Example III was repeated except that the feed was 4,4-difluorohexahydrophthalic anhydride, the vapor temperature was 240° C., reaction temperature was 255° C., the organic rate was 0.5 grams/minute, and the chlorine rate was 183 ml/min. The product, 4-fluorophthalic anhydride, was produced in 80% yield and 90% purity.

Figure 2:
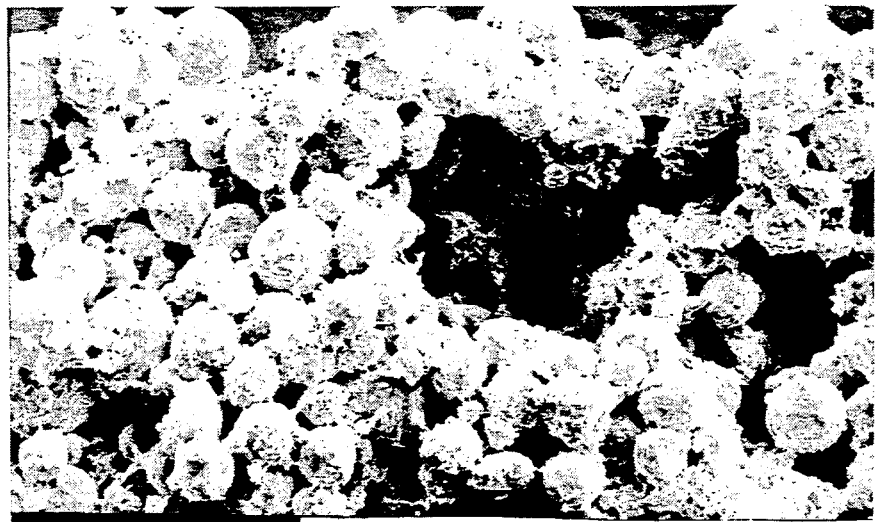
FIG. 2 is a view similar to that of FIG. 1, however at a magnification of 100.
Figure 3:
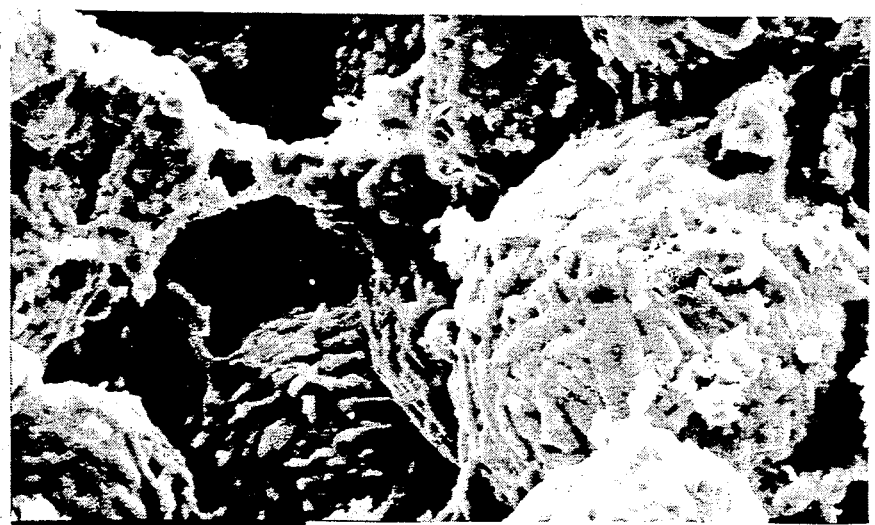
FIG. 3 is a view at a still larger magnification, namely 500.
Figure 1:
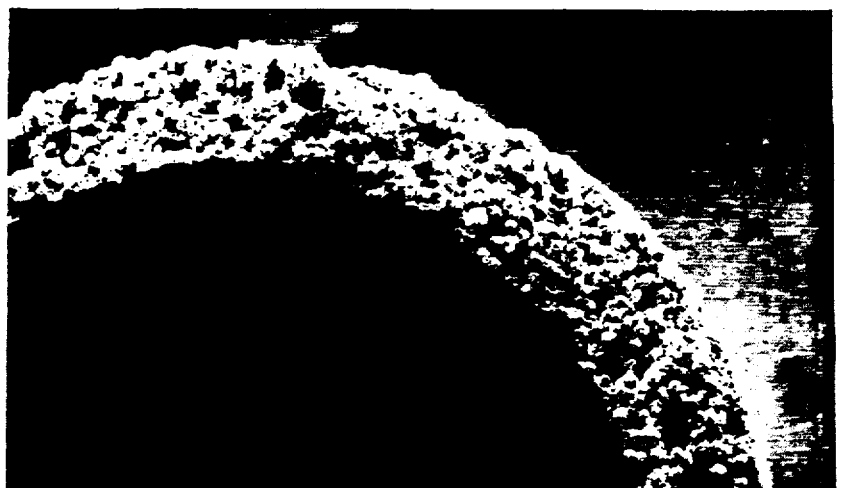
Figure 2:
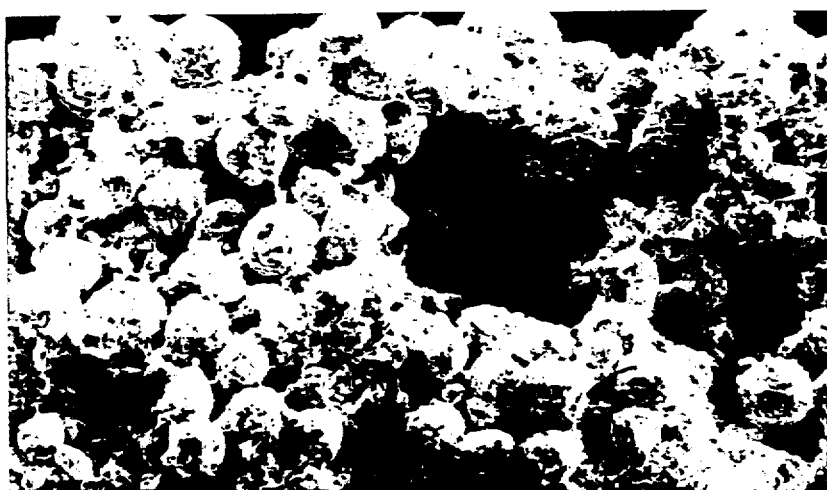
Figure 3:
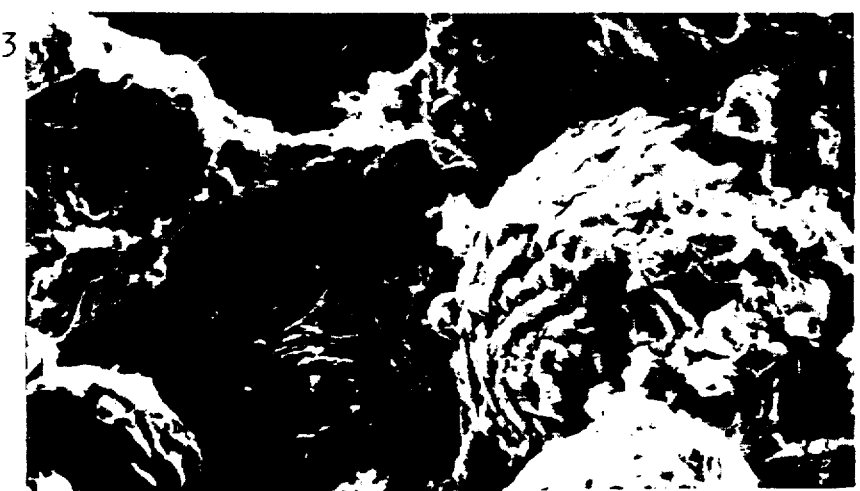

We claim:

1. A process for the preparation of halogen substituted phthalic anhydrides of the formula:

nated water. These components were mixed in a kneading mixer until the mass was sufficiently plastified. The resulting mass was extruded through a vacuum extrusion press to form a tubular green body having an outer diameter of 10 mm and an inner diameter of 8 mm. These green bodies were then subjected to a preliminary burn-out and coking step by heating the tubular members at a 1° K/minute heat-up until the temperature of 600° C. was reached, whereby the free carbon was coked. The subsequent sintering took place at a temperature of 2100° C. in an argon atmosphere (FIG. 1–3).

Although the invention has been described with reference to specific example embodiments, it will be appreciated, that it is intended to cover all modifications and equivalents within the scope of the appended claims.

What we claim is:

1. A method for producing a porous form body of sinterable silicon carbide, comprising the following steps:
   (a) forming a suspension of sinter-active SiC-powder including free carbon and an additive selected from the group consisting of aluminum and boron, in a solvent including a binding agent,
   (b) forming droplets of said suspension, said droplets having a droplet size larger than a powder particle size,
   (c) partially drying said droplets to form a granular material of substantially spherical granules which are still moist to retain their substantially spherical shape due to said binding agent,
   (d) providing a negative mold of said form body and coating said negative mold with said substantially spherical granule which are still sufficiently moist so that said substantially spherical granules stick to each other at surface contact points to form a porous layer on said negative mold,
   (e) further drying said porous layer on said negative mold to impart to said layer a dimensional stability sufficient to assume the configuration of said form body in which said substantially spherical granules still stick together at said surface contact points and for removing said porous form body as a unit from said negative mold, and
   (f) removing said unit from said negative mold and sintering said unit for completing said porous form body wherein said substantially spherical granules form interlinked open ducts due to said surface contact points.

2. The method of claim 1, wherein said step of forming droplets is performed by spraying said suspension through a spraying nozzle to form a spray jet of said suspension, wherein said step of drying is performed by drying said spray jet, and wherein said step of coating is performed by spraying said spray jet onto said negative mold.

3. The method of claim 1, wherein said solvent is selected from the group consisting of water, alcohol, and mixtures of water and alcohol.

4. The method of claim 1, wherein said binding agent is selected from the group consisting of resins, mixtures of resins, and mold release agents.

5. The method of claim 1, further comprising inserting into said layer of granular material space elements which take up respective spaces in said layer, and then heat treating said layer for removing said space elements to form pores in said spaces where said space elements were located.

6. The method of claim 5, wherein said space elements are introduced simultaneously with said coating step.

7. The method of claim 5, wherein said space elements are made of materials selected from the group consisting of ammonium carbonate, wax, synthetic spheres, sawdust, and graphite.

8. A method for producing a porous form body of sinterable silicon carbide, comprising the following steps:
   (a) forming a suspension of sinter-active SiC-powder including free carbon and an additive selected from the group consisting of aluminum and boron, in a solvent including a boding agent,
   (b) forming droplets of said suspension, said droplets having a droplet size larger than a powder particle size,
   (c) partially drying said droplets to form a granular material of substantially spherical granules which are still moist to retain their substantially spherical shape due to said bonding agent,
   (d) adding a plastifier to said substantially spherical granules, said plastifier and said bonding agent being chemically and physically neutral relative to each other, for forming a deformable mass by adding a second solvent that is chemically and physically neutral relative to the bonding agent,
   (e) shaping said deformable mass into a green body, in which said substantially spherical granules stick to each other at surface contact points, and
   (f) further drying said green body until the dried green body, in which said substantially spherical granules still stick to each other, has a sufficient green strength or form stability, and sintering said dried green body for completing said porous form body, wherein said substantially spherical granules form interlinked open ducts due to said surface contact points.

9. The method of claim 8, wherein said shaping step is performed by pressing said deformable mass.

10. The method of claim 8, wherein said step of shaping is performed by slip-casting said deformable mass.

11. The method of claim 8, wherein said solvent is selected from the group consisting of water, suitable organic solvents, and mixtures of water and suitable organic solvents.

12. The method of claim 8, wherein said bonding agent is selected from the group consisting of resins.

13. The method of claim 8, further comprising subjecting said substantially spherical to a heat treatment step for curing or for a preliminary sintering.

14. The method of claim 8, further comprising passing said substantially spherical granules, prior to adding said plastifier, through a screening operation for forming batches of substantially spherical granules having a predetermined size in each batch.

15. The method of claim 8, wherein said plastifier is selected from the group consisting of wax, polyethylene glycol, carboxyl-methyl cellulose, galacto-manose, methacrylate, saccharose, polystyrene, and polyvinyl alcohol.

16. The method of claim 15, wherein said plastifier contains a plastifier solvent selected from the group consisting of water and organic solvents.

17. The method of claim 8, wherein said plastifier is added to said granular material by combining 70 to 79% by weight of sinter-active SiC granular material, 1 to 4% by weight of galacto-manose and 20 to 26% by weight of water.

18. The method of claim 8, wherein said plastifier is added to said granular material by combining to 94 to 97% by weight of sinter-active SiC granular material, 1 to 2% by weight of polyvinyl alcohol and 2 to 5% by weight of water.

19. The method of claim 8, further comprising inserting into said granular material space elements which take up respective spaces in said green body and then heat treating said green body for removing said space elements to form pores in said spaces where said space elements were located.

20. The method of claim 8, further comprising performing at temperatures within the range of about 160° to about 600° C., a bake-out and coking step prior to said sintering step, said bake-out and coking step being performed in a vacuum.

21. The method of claim 8, wherein said step of forming droplets is performed by spraying said suspension through a spraying nozzle to form a spray jet of said suspension, and wherein said step of drying is performed by drying said spray jet.

22. The method of claim 8, wherein said space elements are made of material selected from the group consisting of ammonium carbonate, wax, suitable synthetic spheres, sawdust, and graphite.

* * * * *

UNITED STATES PATENT AND TRADEMARK OFFICE
CERTIFICATE OF CORRECTION

PATENT NO. : 5,001,088                     Page 1 of 8

DATED      : March 19, 1991

INVENTOR(S) : Holger Hauptmann et al

It is certified that error appears in the above-identified patent and that said Letters Patent is hereby corrected as shown below:

Column 1 through 10 referring to 5,001,088 should
be deleted to appear as per attached columns.

Signed and Sealed this

Seventh Day of July, 1992

Attest:

DOUGLAS B. COMER

*Attesting Officer*       Acting Commissioner of Patents and Trademarks

United States Patent [19]

Hauptmann et al.

[11] Patent Number: 5,001,088

[45] Date of Patent: Mar. 19, 1991

[54] METHOD FOR PRODUCING POROUS FORM BODIES

[75] Inventors: Holger Hauptmann, Karlsfeld; Gerhard Andrees, Munich, both of Fed. Rep. of Germany

[73] Assignee: MTU Motoren- und Turbinen-Union, Munich, Fed. Rep. of Germany

[21] Appl. No.: 262,479

[22] Filed: Oct. 25, 1988

[30] Foreign Application Priority Data

Oct. 29, 1987 [DE] Fed. Rep. of Germany ....... 3736660

[51] Int. Cl.⁵ ............................................. C04B 35/56
[52] U.S. Cl. ................................. 501/90; 501/81; 501/82; 501/83; 501/89; 264/43; 264/44
[58] Field of Search .................. 501/81, 83, 89, 90, 501/82; 264/43, 44

[56] References Cited

U.S. PATENT DOCUMENTS

| | | |
|---|---|---|
| 4,124,667 | 11/1978 | Coppola et al. .......... 501/90 |
| 4,522,744 | 6/1985 | Argall et al. .............. 264/44 |
| 4,525,461 | 1/1985 | Boecker et al. .......... 501/90 |
| 4,551,436 | 11/1985 | Johnson et al. .......... 501/90 |

FOREIGN PATENT DOCUMENTS

| | | | |
|---|---|---|---|
| 59-8668 | 1/1984 | Japan .................. | 501/90 |
| 60-255681 | 12/1985 | Japan .................. | 264/44 |
| 7607252 | 1/1977 | Netherlands ........ | 501/89 |

*Primary Examiner*—William R. Dixon, Jr.
*Assistant Examiner*—David M. Brunsman
*Attorney, Agent, or Firm*—W. G. Fasse; D. H. Kane, Jr.

[57] ABSTRACT

A porous form body is produced of sinterable SiC-powder by forming a suitable suspension of said SiC-powder and then treating the suspension to convert it into droplets and the droplets into a granular material in which the granules are substantially larger than the particles of SiC-powder. The granular material is then formed into a green body, e.g. by spraying the granules onto a negative mold of the form body or slip-casting or the like. The green body is then sintered whereby the resulting porosity in the final form body provides the form body with low drag.

22 Claims, 1 Drawing Sheet

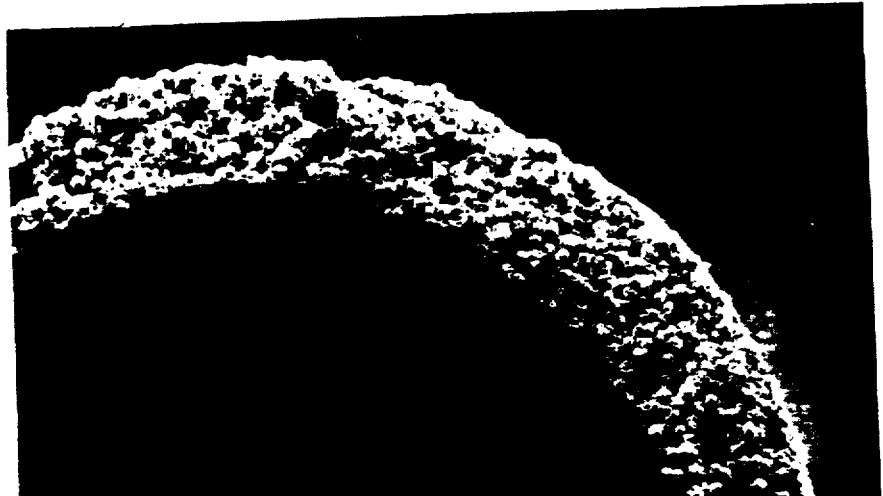

METHOD FOR PRODUCING POROUS FORM BODIES

FIELD OF THE INVENTION

The invention relates to a method for producing porous form bodies of sinterable silicon carbide, whereby special production steps result in large pores in the final product.

DESCRIPTION OF THE PRIOR ART

Many methods are known for producing form bodies of sinterable silicon carbide. However, conventionally it is the aim to achieve a density as high as possible in the final product. Conventionally, thus, the form body wall shall not be porous. The purpose of conventionally avoiding pores in sintered products is to prevent stress peaks in the sintered material around the pores when the form body is exposed to loads. In other words, the pores conventionally cause a reduced strength of such form bodies and it has been the aim heretofore to prevent such loss of strength. It is known to use sinter-active silicon carbide in its α or β form for preparing the green body in a pressing step or in an injection molding step, or in a slip-casting method, whereby negative molds may be used. Thereafter, the green body is sintered, whereby it is possible to obtain a final form body having a low porosity and the advantageous characteristics of ceramics, such as high temperature resistance.

Attempts to produce intentionally a porous form body of ceramic material which body has a satisfactory mechanical strength and simultaneously a low flow drag have not yielded the desired results heretofore. An especially disadvantageous conventional result is the fact that the porosity that could be achieved is primarily present in the form of closed hollow spaces resulting in poor through-flow characteristics due to drag.

OBJECTS OF THE INVENTION

In view of the foregoing it is the aim of the invention to achieve the following objects singly or in combination:

to provide a method for producing a form body of high porosity made of sinterable silicon carbide, while simultaneously assuring a relatively high mechanical strength;

to produce a porosity in such form bodies which can be substantially controlled as desired to achieve predetermined porosities and results;

to produce a form body with open rather than closed pores, said open pores causing a small flow drag;

to provide a porous form body suitable for use at high temperatures, including high temperature changes or fluctuations;

to provide method steps which will increase the size of the silicon carbide powder particles to form granules which permit controlling the pore sizes and the pore distribution throughout the volume of the form body; and to provide hollow form bodies suitable for use as high temperature gas bearings, for example, in turbochargers, or for high temperature gas filters operating user similarly severe conditions.

SUMMARY OF THE INVENTION

According to the invention the sinterable silicon carbide powder is first converted into a granular material having granules of substantially larger size than the particles of the silicon carbide powder. First, the sinter-active or sinterable silicon carbide powder particles are suspended to form a slurry or suspension which includes free carbon and an additive such as aluminum and/or boron, as well as a bonding agent that is dispersed in a suitable solvent. The so formed suspension is then converted into droplets, for example, by spraying through a spraying nozzle to form a spray jet of the suspension. As mentioned, the droplets shall have a size substantially larger than the SiC powder particle size. For example, the droplet diameter may be in the range of 90 to 250 microns. The droplets are dried to form the granular material having granules of substantially spherical configuration which retain their shape. The granular material may then be used in different ways to form a green mold body which is then sintered. For example, the spray jet may be sprayed onto a negative mold of the porous form body, whereby the negative mold is coated with the granular material of which the granules stick to each other to form a layer on the negative mold. The layer is further dried to impart to the layer a dimensional stability sufficient to assume the configuration of the form body and also sufficient for removing the layer of granular material as a unit from the negative mold. The removed unit is then sintered for completing the porous form body.

Another possibility of forming the green body involves adding a plastifier to the granular material, the plastifier is soluble in a second solvent, whereas the bonding agent must be chemically and physically neutral relative to the plastifier and solvent. The plastifier forms a deformable mass of the granular material which is either pourable or pressable or otherwise shapeable. The deformable mass is then shaped into the green body which is further dried until the dried green body has a sufficient green strength or form stability so that it may be moved into a sintering oven for sintering and completing the porous form body.

As a result of the above outlined methods according to the invention, the present porous form body is made up of a multitude of approximately spherical granules, whereby these granules retain their substantially spherical configuration during the initial shaping and the subsequent sintering. These spherical particles stick together and thereby form a labyrinth of hollow open spaces resulting in open interconnected large pores which cause only a small drag.

The invention avoids the small individual pores according to the prior art which are mostly not interconnected so that a through-flow through the wall of such a form body involves substantial flow losses due to drag. The invention also avoids the problem of insufficient mechanical strength caused heretofore by an insufficient density as a result of a large number of narrow diameter connecting channels between the pores.

A very important advantage of the method according to the invention is that it produces porous form bodies that can be used under high temperature operating conditions, for example, the present form bodies can be used as air or gas bearings under severe thermal load conditions, for example, in turbo-chargers. The present porous form bodies can also be used as high temperature filters for filtering hot gases, especially hot gases carrying aggressive components such as acids or caustic solutions or solid particles such as soot.

Still another advantage of the form bodies according to the invention is seen in that their temperature resistance, especially at temperature fluctuations within a wide range, can be controlled by controlling the porosity. It has been found that a porosity of about 20% by volume of the total volume of the form body provides the required high temperature resistance. Thus, the present form bodies can be used for constructing combustion chamber walls, whereby it is possible to cover the internal wall surfaces with so-called fine layers of sintered material having a high density.

BRIEF DESCRIPTION OF THE DRAWINGS

In order that the invention may be clearly understood, it will now be described, by way of example, with reference to the accompanying drawings, wherein:

FIG. 1 is a photograph of a portion of a form body in the form of a cylinder produced according to the invention, whereby the photograph was taken at a magnification of 20;

FIG. 2 is a view similar to that of FIG. 1, however at a magnification of 100; and FIG. 3 is a view at a still larger magnification, namely 500.

DETAILED DESCRIPTION OF PREFERRED EXAMPLE EMBODIMENTS AND OF THE BEST MODE OF THE INVENTION

Referring first to the drawings, it is apparent that the granular material produced according to the invention has granules with a substantially spherical or globular configuration. These globules of silicon carbide are bonded to each other at their surface contact points, by the sintering while simultaneously forming an interlinked network of hollow spaces or large pores as best seen from FIGS. 2 and 3. Especially, in FIG. 3 the hollow interlinked ducts or channels are well visible as dark areas. It has been found that these channels have a relatively small flow drag. The porosity of the cylinder wall permits a gas flow through the porous cylinder wall of 7 liters/cm$^2$ of wall surface per minute with a pressure differential across the cylinder wall of 100 millibar.

According to one embodiment of the invention sinterable or sinter-active silicon carbide powder having a specific surface area of 10 to 50 m$^2$/g is suspended in a solvent together with a bonding agent. The powder particles are conventionally smaller than 10 micron. A source of free carbon is added to the silicon powder in a quantity of 0.5 to 5% by weight. The purpose of the addition of free carbon is to reduce any formation of SiO$_2$ glass layers by the formation of carbon oxides. The bonding agent is introduced into the slurry for controlling the formation of the globular granules. The function of the additives boron and/or aluminum is their enhancement of the subsequent sintering process. The powder is introduced into water or alcohol or a mixture of water and alcohol with other organic solvents for forming a slurry or suspension. The solvent is selected with a view to its ability to easily evaporate under vacuum or under the influence of heat. Binder agents or bonding agents are added to the solvent. Such bonding agents include phenolic resins or polyvinyl alcohols. The bonding agents make sure that any drying subsequent to the comminution, for example by spraying, will not cause the globular granules to return back to the particle size of the silicon carbide powder. Various bonding agents may be used according to the invention. Rapidly reacting multicomponent resins have been found to be suitable for the present purposes. These resins have the added advantage that they simultaneously form a source for the free carbon said binding or bonding agents also include a parting or mold release agent.

The so formed suspension or slurry is then sprayed through spray nozzles to convert the suspension into droplets which are dried on their surface as they are being formed. The drying takes place either by blowing the droplets into a hot gas atmosphere or by irradiating the droplet spray with an infrared or microwave radiation to heat the droplets for evaporating at least a portion of the solvent to solidify the outer contour of the droplets to form granules. Both mentioned drying methods can be used in combination. In any event, the droplets are stabilized in their substantially spherical configuration. Stated differently, when the partially dried droplets contact a surface, they do not change their substantially spherical shape. The temperature and duration of drying are dependent on the shape and size of the formed bodies and of the used drying method.

In one embodiment of the invention a green body is formed by introducing a negative mold of the form body into the jet mist at a point where the droplets have been sufficiently dried to form particles that will adhere to the surface of the negative mold which is then uniformly coated to form the desired wall thickness. Preferably, the negative mold is preheated in order to enhance the drying process. Additionally, the negative mold is moved in the spray mist of drying droplets so as to form a uniform layer on the negative mold, especially a layer of uniform thickness. Due to the liquid removal from the droplets as a result of the drying, the viscosity is increased to such an extent that the resulting granules substantially retain their substantially spherical shape while still being able to intimately bond to other granules when they contact each other to form the green body. An advantage of the invention is seen in that the size of the droplets and thus of the granules can be controlled by controlling the viscosity of the suspension or slurry, by controlling the solid component content in the slurry, by controlling the spraying pressure and/or the nozzle size, whereby these factors can be modified within wide ranges to be ascertained by simple experiment. Another advantage is that modifying these control factors also controls the size of the pores as well as their distribution so that a more or less porous structure can be formed in the final form body having the desired total pore volume and pore size.

When the layer formation is completed on the negative mold the drying is continued until the green body has a sufficient dimensional stability for removal from the negative mold and for introduction into the sintering process.

According to another embodiment of the invention, the granular material obtained as described above may be converted into a deformable material by adding a plastifier. Incidentally, the quantity of aluminum and/or bore additives may be in the range of 0.1 to 1.5% by weight and the bonding components shall be such that in the following production steps the bonding agents shall not go into solution, nor shall they soften, nor shall they swell. Further, the bonding system or agents must assure that the granular material will assume a sufficient form stability by the application of pressure when the green body is formed. Phenolic resins or polyvinyl alcohols are especially suitable for the bonding agents.

As mentioned, spray drying of the suspension is suitable for forming the granular material having substantially spherical or globular granules. However, other granulation methods may be employed, such as pelleting or comminuting or the like. In any event, the resulting granules will have a substantially larger diameter and hence a smaller surface area than the silicon carbide powder particles.

The following materials are suitable for use as plastifiers to form a mass that can be pressed, molded, or poured to form the green body: wax, polyethylene glycol, polyvinyl alcohol, carboxyl methylcellulose, galactomanose, methacrylate, saccharose, and polystyrene. The deformable mass is preferably prepared in a so-called kneading mixer, whereby a substantial pressure stability, or rather stability under pressure, is imparted to the granular material. Thus, the deformable material or rather the granular material within the deformable mass retains the shape of the granules when the deformable mass is subjected to the formation of the green body under pressure. In any event, the second solvents and the bonding agents are so selected relative to each other that they remain physically and chemically neutral relative to each other so that there is no reaction between the solvents and the bonding agents.

Preferably, the so-formed granular materials are subjected to a preliminary bake-out or coking operation at temperatures below 600° C. for curing the employed resin or at higher temperatures to achieve a preliminary sintering of the silicon carbide. This step assures a substantial pressure stability of the granular material.

Once the deformable mass is ready, the green body is formed by a press molding or slip casting operation. Compression moldings are suitable primarily for form bodies having a relatively simple geometric configuration which can be formed, for example, even by so-called die pressing. Slip-casting methods are employed to make more complicated configurations which may be hollow or solid throughout. The slip-casting may be performed without compression or under pressure. Combinations of slip-casting steps under pressure and without pressure may be used. It has been found that electrolytes which heretofore have been used in the production of high density silicon carbide material or components can also be used in connection with the preparation of the deformable mass for controlling the viscosity of the mass and as bonding agents, as well as dispersion stabilizer and deflocculant. Depending on the addition of bonding agents, it is possible to form of the deformable mass so-called endless sectional profiles, for example, by extrusion. Components having a complicated configuration are preferably formed by injection molding.

According to the invention, it has been found that the size of the pores and their distribution, as well as their proportion relative to the entire volume of the form body can be controlled by the use of foreign particles as so-called space elements which are introduced into the granular material. These space elements are made of materials which during the following heat treatments, such as the coking or sintering, will be removed again by being burned out. The introduction of the space elements takes place simultaneously with the formation of the form body, or rather the green body or it is performed in between, for example, subsequent to the spraying and before the next heating step. When the green body is formed by a spraying operation, the space elements can be applied by simultaneously spraying these elements out of a second spraying nozzle. Materials suitable for this purpose are, for example ammonium carbonate, wax globules, suitable synthetic spheres, sawdust, or graphite particles.

EXAMPLE EMBODIMENTS

EXAMPLE 1

The following materials in percent by weight proportions were mixed in a mixer suitable to sufficiently homogenize the suspension.

| | |
|---|---|
| α-SiC (average particle size 0.5/μm) | 50.0% (wt) |
| amorphous boron | 0.3 |
| phenolic resin (Novolac-type) | 2.0 |
| acetone | 6.0 |
| liquid ammonia (25% solution) | 6.4 |
| desalinated water | 30.3 |
| polyvinylacohol | 5.0 |

The mixing and homogenizing of the above listed components resulted in a suspension which was then sprayed through a stationary two-component nozzle. The negative mold of the form body was prepared as a metal cone which was preheated in a hot gas stream. The preheated cone was then introduced into the spray mist where it was continuously rotated to form a uniform coating on its surface, said coating having a uniform thickness throughout. The hot gas temperature was about 240° C. and the spacing between the negative mold and the spraying nozzle was about 80 cm. After the desired wall thickness had been reached, the so formed green body was further dried in a hot gas stream. The resulting green blank could be lifted off the negative mold or metal core for a further heat treatment and subsequent sintering. The intermediate heat treatment resulted in the removal of the bonding agents while simultaneously coking the free carbon provided by the free carbon source mentioned above. The intermediate temperature treatment for coking and burn-out took place in a low vacuum of about 100 to 760 Torr at a heat up rate of about 1° K/minute until a maximum temperature $T_{max}$ of 600° C. was reached. The subsequent sintering step was performed in an argon atmosphere at a maximum temperature of about 2100° C. and for a duration of about 5 minutes.

EXAMPLE 2

| | |
|---|---|
| α-SiC (average grain diameter 0.5/μm) | 93.6% (wt.) |
| amorphous boron | 0.4% (wt.) |
| phenolic resin | 6.0% (wt.) |

This mixture is introduced into a water acetone mixture to form a pumpable suspension having a weight per liter of 1.75 kg/l.

The suspension was then sprayed in a spray tower in which the droplets were dried by hot gases. The resulting granular material was then introduced into a heatable rotating drum for curing the resin components at a temperature of about 160° C. Thereafter, the granular material was passed through a screen to remove that fraction having a diameter exceeding 90 microns. These larger diameter granules were then used to form a plastically deformable mass by using 40% by weight of this granular fraction, 24% PE-WAX as a space element material in a fraction of 90–250 microns, 3% by weight of galactomanose, and 30% by weight of fully desalinated water. These components were mixed in a kneading mixer until the mass was sufficiently plastified. The resulting mass was extruded through a vacuum extrusion press to form a tubular green body having an outer diameter of 10 mm and an inner diameter of 8 mm. These green bodies were then subjected to a preliminary burn-out and coking step by heating the tubular members at a 1° K/minute heat-up until the temperature of 600° C. was reached, whereby the free carbon was coked. The subsequent sintering took place at a temperature of 2100° C. in an argon atmosphere (FIG. 1-3).

Although the invention has been described with reference to specific example embodiments, it will be appreciated, that it is intended to cover all modifications and equivalents within the scope of the appended claims.

What we claim is:

1. A method for producing a porous form body of sinterable silicon carbide, comprising the following steps:
   (a) forming a suspension of sinter-active SiC-powder including free carbon and an additive selected from the group consisting of aluminum and boron, in a solvent including a binding agent,
   (b) forming droplets of said suspension, said droplets having a droplet size larger than a powder particle size,
   (c) partially drying said droplets to form a granular material of substantially spherical granules which are still moist to retain their substantially spherical shape due to said binding agent,
   (d) providing a negative mold of said form body and coating said negative mold with said substantially spherical granule which are still sufficiently moist so that said substantially spherical granules stick to each other at surface contact points to form a porous layer on said negative mold,
   (e) further drying said porous layer on said negative mold to impart to said layer a dimensional stability sufficient to assume the configuration of said form body in which said substantially spherical granules still stick together at said surface contact points and for removing said porous form body as a unit from said negative mold, and
   (f) removing said unit from said negative mold and sintering said unit for completing said porous form body wherein said substantially spherical granules form interlinked open ducts due to said surface contact points.

2. The method of claim 1, wherein said step of forming droplets is performed by spraying said suspension through a spraying nozzle to form a spray jet of said suspension, wherein said step of drying is performed by drying said spray jet, and wherein said step of coating is performed by spraying said spray jet onto said negative mold.

3. The method of claim 1, wherein said solvent is selected from the group consisting of water, alcohol, and mixtures of water and alcohol.

4. The method of claim 1, wherein said binding agent is selected from the group consisting of resins, mixtures of resins, and mold release agents.

5. The method of claim 1, further comprising inserting into said layer of granular material space elements which take up respective spaces in said layer, and then heat treating said layer for removing said space elements to form pores in said spaces where said space elements were located.

6. The method of claim 5, wherein said space elements are introduced simultaneously with said coating step.

7. The method of claim 5, wherein said space elements are made of materials selected from the group consisting of ammonium carbonate, wax, synthetic spheres, sawdust, and graphite.

8. A method for producing a porous form body of sinterable silicon carbide, comprising the following steps:
   (a) forming a suspension of sinter-active SiC-powder including free carbon and an additive selected from the group consisting of aluminum and boron, in a solvent including a boding agent,
   (b) forming droplets of said suspension, said droplets having a droplet size larger than a powder particle size,
   (c) partially drying said droplets to form a granular material of substantially spherical granules which are still moist to retain their substantially spherical shape due to said bonding agent,
   (d) adding a plastifier to said substantially spherical granules, said plastifier and said bonding agent being chemically and physically neutral relative to each other, for forming a deformable mass by adding a second solvent that is chemically and physically neutral relative to the bonding agent,
   (e) shaping said deformable mass into a green body, in which said substantially spherical granules stick to each other at surface contact points, and
   (f) further drying said green body until the dried green body, in which said substantially spherical granules still stick to each other, has a sufficient green strength or form stability, and sintering said dried green body for completing said porous form body, wherein said substantially spherical granules form interlinked open ducts due to said surface contact points.

9. The method of claim 8, wherein said shaping step is performed by pressing said deformable mass.

10. The method of claim 8, wherein said step of shaping is performed by slip-casting said deformable mass.

11. The method of claim 8, wherein said solvent is selected from the group consisting of water, suitable organic solvents, and mixtures of water and suitable organic solvents.

12. The method of claim 8, wherein said bonding agent is selected from the group consisting of resins.

13. The method of claim 8, further comprising subjecting said substantially spherical to a heat treatment step for curing or for a preliminary sintering.

14. The method of claim 8, further comprising passing said substantially spherical granules, prior to adding said plastifier, through a screening operation for forming batches of substantially spherical granules having a predetermined size in each batch.

15. The method of claim 8, wherein said plastifier is selected from the group consisting of wax, polyethylene glycol, carboxyl-methyl cellulose, galacto-manose, methacrylate, saccharose, polystyrene, and polyvinyl alcohol.

16. The method of claim 15, wherein said plastifier contains a plastifier solvent selected from the group consisting of water and organic solvents.

17. The method of claim 8, wherein said plastifier is added to said granular material by combining 70 to 79% by weight of sinter-active SiC granular material, 1 to 4% by weight of galacto-manose and 20 to 26% by weight of water.

18. The method of claim 8, wherein said plastifier is added to said granular material by combining to 94 to 97% by weight of sinter-active SiC granular material, 1 to 2% by weight of polyvinyl alcohol and 2 to 5% by weight of water.

19. The method of claim 8, further comprising inserting into said granular material space elements which take up respective spaces in said green body and then heat treating said green body for removing said space elements to form pores in said spaces where said space elements were located.

20. The method of claim 8, further comprising performing at temperatures within the range of about 160° to about 600° C., a bake-out and coking step prior to said sintering step, said bake-out and coking step being performed in a vacuum.

21. The method of claim 8, wherein said step of forming droplets is performed by spraying said suspension through a spraying nozzle to form a spray jet of said suspension, and wherein said step of drying is performed by drying said spray jet.

22. The method of claim 8, wherein said space elements are made of material selected from the group consisting of ammonium carbonate, wax, suitable synthetic spheres, sawdust, and graphite.

* * * * *

UNITED STATES PATENT AND TRADEMARK OFFICE
CERTIFICATE OF CORRECTION

PATENT NO. : 5,001,088

DATED : March 19, 1991

INVENTOR(S) : Holger Hauptmann et al

It is certified that error appears in the above-identified patent and that said Letters Patent is hereby corrected as shown below:

Column 1, through 10 referring to 5,003,088 should be deleted to appear as per attached pages.

This certificate supersedes Certificate of Correction issued July 7, 1992.

Signed and Sealed this

Twenty-fifth Day of August, 1992

Attest:

DOUGLAS B. COMER

Attesting Officer    Acting Commissioner of Patents and Trademarks

METHOD FOR PRODUCING POROUS FORM BODIES

FIELD OF THE INVENTION

The invention relates to a method for producing porous form bodies of sinterable silicon carbide, whereby special production steps result in large pores in the final product.

DESCRIPTION OF THE PRIOR ART

Many methods are known for producing form bodies of sinterable silicon carbide. However, conventionally it is the aim to achieve a density as high as possible in the final product. Conventionally, thus, the form body wall shall not be porous. The purpose of conventionally avoiding pores in sintered products is to prevent stress peaks in the sintered material around the pores when the form body is exposed to loads. In other words, the pores conventionally cause a reduced strength of such form bodies and it has been the aim heretofore to prevent such loss of strength. It is known to use sinteractive silicon carbide in its $\alpha$ or $\beta$ form for preparing the green body in a pressing step or in an injection molding step, or in a slip-casting method, whereby negative molds may be used. Thereafter, the green body is sintered, whereby it is possible to obtain a final form body having a low porosity and the advantageous characteristics of ceramics, such as high temperature resistance.

Attempts to produce intentionally a porous form body of ceramic material which body has a satisfactory mechanical strength and simultaneously a low flow drag have not yielded the desired results heretofore. An especially disadvantageous conventional result is the fact that the porosity that could be achieved is primarily present in the form of closed hollow spaces resulting in poor through-flow characteristics due to drag.

OBJECTS OF THE INVENTION

In view of the foregoing it is the aim of the invention to achieve the following objects singly or in combination:

to provide a method for producing a form body of high porosity made of sinterable silicon carbide, while simultaneously assuring a relatively high mechanical strength;

to produce a porosity in such form bodies which can be substantially controlled as desired to achieve predetermined porosities and results;

to produce a form body with open rather than closed pores, said open pores causing a small flow drag;

to provide a porous form body suitable for use at high temperatures, including high temperature changes or fluctuations;

to provide method steps which will increase the size of the silicon carbide powder particles to form granules which permit controlling the pore sizes and the pore distribution throughout the volume of the form body; and to provide hollow form bodies suitable for use as high temperature gas bearings, for example, in turbochargers, or for high temperature gas filters operating user similarly severe conditions.

SUMMARY OF THE INVENTION

According to the invention the sinterable silicon carbide powder is first converted into a granular material having granules of substantially larger size than the particles of the silicon carbide powder. First, the sinteractive or sinterable silicon carbide powder particles are suspended to form a slurry or suspension which includes free carbon and an additive such as aluminum and/or boron, as well as a bonding agent that is dispersed in a suitable solvent. The so formed suspension is then converted into droplets, for example, by spraying through a spraying nozzle to form a spray jet of the suspension. As mentioned, the droplets shall have a size substantially larger than the SiC powder particle size. For example, the droplet diameter may be in the range of 90 to 250 microns. The droplets are dried to form the granular material having granules of substantially spherical configuration which retain their shape. The granular material may then be used in different ways to form a green mold body which is then sintered. For example, the spray jet may be sprayed onto a negative mold of the porous form body, whereby the negative mold is coated with the granular material of which the granules stick to each other to form a layer on the negative mold. The layer is further dried to impart to the layer a dimensional stability sufficient to assume the configuration of the form body and also sufficient for removing the layer of granular material as a unit from the negative mold. The removed unit is then sintered for completing the porous form body.

Another possibility of forming the green body involves adding a plastifier to the granular material, the plastifier is soluble in a second solvent, whereas the bonding agent must be chemically and physically neutral relative to the plastifier and solvent. The plastifier forms a deformable mass of the granular material which is either pourable or pressable or otherwise shapeable. The deformable mass is then shaped into the green body which is further dried until the dried green body has a sufficient green strength or form stability so that it may be moved into a sintering oven for sintering and completing the porous form body.

As a result of the above outlined methods according to the invention, the present porous form body is made up of a multitude of approximately spherical granules, whereby these granules retain their substantially spherical configuration during the initial shaping and the subsequent sintering. These spherical particles stick together and thereby form a labyrinth of hollow open spaces resulting in open interconnected large pores which cause only a small drag.

The invention avoids the small individual pores according to the prior art which are mostly not interconnected so that a through-flow through the wall of such a form body involves substantial flow losses due to drag. The invention also avoids the problem of insufficient mechanical strength caused heretofore by an insufficient density as a result of a large number of narrow diameter connecting channels between the pores.

A very important advantage of the method according to the invention is that it produces porous form bodies that can be used under high temperature operating conditions, for example, the present form bodies can be used as air or gas bearings under severe thermal load conditions, for example, in turbo-chargers. The present porous form bodies can also be used as high temperature filters for filtering hot gases, especially hot gases carrying aggressive components such as acids or caustic solutions or solid particles such as soot.

Still another advantage of the form bodies according to the invention is seen in that their temperature resistance, especially at temperature fluctuations within a wide range, can be controlled by controlling the porosity. It has been found that a porosity of about 20% by volume of the total volume of the form body provides the required high temperature resistance. Thus, the present form bodies can be used for constructing combustion chamber walls, whereby it is possible to cover the internal wall surfaces with so-called fine layers of sintered material having a high density.

BRIEF DESCRIPTION OF THE DRAWINGS

In order that the invention may be clearly understood, it will now be described, by way of example, with reference to the accompanying drawings, wherein:

FIG. 1 is a photograph of a portion of a form body in the form of a cylinder produced according to the invention, whereby the photograph was taken at a magnification of 20;

FIG. 2 is a view similar to that of FIG. 1, however at a magnification of 100; and FIG. 3 is a view at a still larger magnification, namely 500.

DETAILED DESCRIPTION OF PREFERRED EXAMPLE EMBODIMENTS AND OF THE BEST MODE OF THE INVENTION

Referring first to the drawings, it is apparent that the granular material produced according to the invention has granules with a substantially spherical or globular configuration. These globules of silicon carbide are bonded to each other at their surface contact points, by the sintering while simultaneously forming an interlinked network of hollow spaces or large pores as best seen from FIGS. 2 and 3. Especially, in FIG. 3 the hollow interlinked ducts or channels are well visible as dark areas. It has been found that these channels have a relatively small flow drag. The porosity of the cylinder wall permits a gas flow through the porous cylinder wall of 7 liters/cm$^2$ of wall surface per minute with a pressure differential across the cylinder wall of 100 millibar.

According to one embodiment of the invention sinterable or sinter-active silicon carbide powder having a specific surface area of 10 to 50 m$^2$/g is suspended in a solvent together with a bonding agent. The powder particles are conventionally smaller than 10 micron. A source of free carbon is added to the silicon powder in a quantity of 0.5 to 5% by weight. The purpose of the addition of free carbon is to reduce any formation of SiO$_2$ glass layers by the formation of carbon oxides. The bonding agent is introduced into the slurry for controlling the formation of the globular granules. The function of the additives boron and/or aluminum is their enhancement of the subsequent sintering process. The powder is introduced into water or alcohol or a mixture of water and alcohol with other organic solvents for forming a slurry or suspension. The solvent is selected with a view to its ability to easily evaporate under vacuum or under the influence of heat. Binder agents or bonding agents are added to the solvent. Such bonding agents include phenolic resins or polyvinyl alcohols. The bonding agents make sure that any drying subsequent to the comminution, for example by spraying, will not cause the globular granules to return back to the particle size of the silicon carbide powder. Various bonding agents may be used according to the invention. Rapidly reacting multicomponent resins have been found to be suitable for the present purposes. These resins have the added advantage that they simultaneously form a source for the free carbon said binding or bonding agents also include a parting or mold release agent.

The so formed suspension or slurry is then sprayed through spray nozzles to convert the suspension into droplets which are dried on their surface as they are being formed. The drying takes place either by blowing the droplets into a hot gas atmosphere or by irradiating the droplet spray with an infrared or microwave radiation to heat the droplets for evaporating at least a portion of the solvent to solidify the outer contour of the droplets to form granules. Both mentioned drying methods can be used in combination. In any event, the droplets are stabilized in their substantially spherical configuration. Stated differently, when the partially dried droplets contact a surface, they do not change their substantially spherical shape. The temperature and duration of drying are dependent on the shape and size of the formed bodies and of the used drying method.

In one embodiment of the invention a green body is formed by introducing a negative mold of the form body into the jet mist at a point where the droplets have been sufficiently dried to form particles that will adhere to the surface of the negative mold which is then uniformly coated to form the desired wall thickness. Preferably, the negative mold is preheated in order to enhance the drying process. Additionally, the negative mold is moved in the spray mist of drying droplets so as to form a uniform layer on the negative mold, especially a layer of uniform thickness. Due to the liquid removal from the droplets as a result of the drying, the viscosity is increased to such an extent that the resulting granules substantially retain their substantially spherical shape while still being able to intimately bond to other granules when they contact each other to form the green body. An advantage of the invention is seen in that the size of the droplets and thus of the granules can be controlled by controlling the viscosity of the suspension or slurry, by controlling the solid component content in the slurry, by controlling the spraying pressure and/or the nozzle size, whereby these factors can be modified within wide ranges to be ascertained by simple experiment. Another advantage is that modifying these control factors also controls the size of the pores as well as their distribution so that a more or less porous structure can be formed in the final form body having the desired total pore volume and pore size.

When the layer formation is completed on the negative mold the drying is continued until the green body has a sufficient dimensional stability for removal from the negative mold and for introduction into the sintering process.

According to another embodiment of the invention, the granular material obtained as described above may be converted into a deformable material by adding a plastifier. Incidentally, the quantity of aluminum and/or bore additives may be in the range of 0.1 to 1.5% by weight and the bonding components shall be such that in the following production steps the bonding agents shall not go into solution, nor shall they soften, nor shall they swell. Further, the bonding system or agents must assure that the granular material will assume a sufficient form stability by the application of pressure when the green body is formed. Phenolic resins or polyvinyl alcohols are especially suitable for the bonding agents.

As mentioned, spray drying of the suspension is suitable for forming the granular material having substantially spherical or globular granules. However, other granulation methods may be employed, such as pelleting or comminuting or the like. In any event, the resulting granules will have a substantially larger diameter and hence a smaller surface area than the silicon carbide powder particles.

The following materials are suitable for use as plastifiers to form a mass that can be pressed, molded, or poured to form the green body: wax, polyethylene glycol, polyvinyl alcohol, carboxyl methylcellulose, galactomanose, methacrylate, saccharose, and polystyrene. The deformable mass is preferably prepared in a so-called kneading mixer, whereby a substantial pressure stability, or rather stability under pressure, is imparted to the granular material. Thus, the deformable material or rather the granular material within the deformable mass retains the shape of the granules when the deformable mass is subjected to the formation of the green body under pressure. In any event, the second solvents and the bonding agents are so selected relative to each other that they remain physically and chemically neutral relative to each other so that there is no reaction between the solvents and the bonding agents.

Preferably, the so-formed granular materials are subjected to a preliminary bake-out or coking operation at temperatures below 600° C. for curing the employed resin or at higher temperatures to achieve a preliminary sintering of the silicon carbide. This step assures a substantial pressure stability of the granular material.

Once the deformable mass is ready, the green body is formed by a press molding or slip casting operation. Compression moldings are suitable primarily for form bodies having a relatively simple geometric configuration which can be formed, for example, even by so-called die pressing. Slip-casting methods are employed to make more complicated configurations which may be hollow or solid throughout. The slip-casting may be performed without compression or under pressure. Combinations of slip-casting steps under pressure and without pressure may be used. It has been found that electrolytes which heretofore have been used in the production of high density silicon carbide material or components can also be used in connection with the preparation of the deformable mass for controlling the viscosity of the mass and as bonding agents, as well as dispersion stabilizer and deflocculant. Depending on the addition of bonding agents, it is possible to form of the deformable mass so-called endless sectional profiles, for example, by extrusion. Components having a complicated configuration are preferably formed by injection molding.

According to the invention, it has been found that the size of the pores and their distribution, as well as their proportion relative to the entire volume of the form body can be controlled by the use of foreign particles as so-called space elements which are introduced into the granular material. These space elements are made of materials which during the following heat treatments, such as the coking or sintering, will be removed again by being burned out. The introduction of the space elements takes place simultaneously with the formation of the form body, or rather the green body or it is performed in between, for example, subsequent to the spraying and before the next heating step. When the green body is formed by a spraying operation, the space elements can be applied by simultaneously spraying these elements out of a second spraying nozzle. Materials suitable for this purpose are, for example ammonium carbonate, wax globules, suitable synthetic spheres, sawdust, or graphite particles.

EXAMPLE EMBODIMENTS

EXAMPLE 1

The following materials in percent by weight proportions were mixed in a mixer suitable to sufficiently homogenize the suspension.

| | |
|---|---|
| α-SiC (average particle size 0.5/μm) | 50.0% (wt) |
| amorphous boron | 0.3 |
| phenolic resin (Novolac-type) | 2.0 |
| acetone | 6.0 |
| liquid ammonia (25% solution) | 6.4 |
| desalinated water | 30.3 |
| polyvinylacohol | 5.0 |

The mixing and homogenizing of the above listed components resulted in a suspension which was then sprayed through a stationary two-component nozzle. The negative mold of the form body was prepared as a metal cone which was preheated in a hot gas stream. The preheated cone was then introduced into the spray mist where it was continuously rotated to form a uniform coating on its surface, said coating having a uniform thickness throughout. The hot gas temperature was about 240° C. and the spacing between the negative mold and the spraying nozzle was about 80 cm. After the desired wall thickness had been reached, the so formed green body was further dried in a hot gas stream. The resulting green blank could be lifted off the negative mold or metal core for a further heat treatment and subsequent sintering. The intermediate heat treatment resulted in the removal of the bonding agents while simultaneously coking the free carbon provided by the free carbon source mentioned above. The intermediate temperature treatment for coking and burn-out took place in a low vacuum of about 100 to 760 Torr at a heat up rate of about 1° K/minute until a maximum temperature $T_{max}$ of 600° C. was reached. The subsequent sintering step was performed in an argon atmosphere at a maximum temperature of about 2100° C. and for a duration of about 5 minutes.

EXAMPLE 2

| | |
|---|---|
| α-SiC (average grain diameter 0.5/μm) | 93.6% (wt.) |
| amorphous boron | 0.4% (wt.) |
| phenolic resin | 6.0% (wt.) |

This mixture is introduced into a water acetone mixture to form a pumpable suspension having a weight per liter of 1.75 kg/l.

The suspension was then sprayed in a spray tower in which the droplets were dried by hot gases. The resulting granular material was then introduced into a heatable rotating drum for curing the resin components at a temperature of about 160° C. Thereafter, the granular material was passed through a screen to remove that fraction having a diameter exceeding 90 microns. These larger diameter granules were then used to form a plastically deformable mass by using 40% by weight of this granular fraction, 24% PE-WAX as a space element material in a fraction of 90–250 microns, 3% by weight of galactomanose, and 30% by weight of fully desalinated water. These components were mixed in a kneading mixer until the mass was sufficiently plastified. The resulting mass was extruded through a vacuum extrusion press to form a tubular green body having an outer diameter of 10 mm and an inner diameter of 8 mm. These green bodies were then subjected to a preliminary burn-out and coking step by heating the tubular members at a 1° K/minute heat-up until the temperature of 600° C. was reached, whereby the free carbon was coked. The subsequent sintering took place at a temperature of 2100° C. in an argon atmosphere (FIG. 1–3).

Although the invention has been described with reference to specific example embodiments, it will be appreciated, that it is intended to cover all modifications and equivalents within the scope of the appended claims.

What we claim is:

1. A method for producing a porous form body of sinterable silicon carbide, comprising the following steps:
   (a) forming a suspension of sinter-active SiC-powder including free carbon and an additive selected from the group consisting of aluminum and boron, in a solvent including a binding agent,
   (b) forming droplets of said suspension, said droplets having a droplet size larger than a powder particle size,
   (c) partially drying said droplets to form a granular material of substantially spherical granules which are still moist to retain their substantially spherical shape due to said binding agent,
   (d) providing a negative mold of said form body and coating said negative mold with said substantially spherical granule which are still sufficiently moist so that said substantially spherical granules stick to each other at surface contact points to form a porous layer on said negative mold,
   (e) further drying said porous layer on said negative mold to impart to said layer a dimensional stability sufficient to assume the configuration of said form body in which said substantially spherical granules still stick together at said surface contact points and for removing said porous form body as a unit from said negative mold, and
   (f) removing said unit from said negative mold and sintering said unit for completing said porous form body wherein said substantially spherical granules form interlinked open ducts due to said surface contact points.

2. The method of claim 1, wherein said step of forming droplets is performed by spraying said suspension through a spraying nozzle to form a spray jet of said suspension, wherein said step of drying is performed by drying said spray jet, and wherein said step of coating is performed by spraying said spray jet onto said negative mold.

3. The method of claim 1, wherein said solvent is selected from the group consisting of water, alcohol, and mixtures of water and alcohol.

4. The method of claim 1, wherein said binding agent is selected from the group consisting of resins, mixtures of resins, and mold release agents.

5. The method of claim 1, further comprising inserting into said layer of granular material space elements which take up respective spaces in said layer, and then heat treating said layer for removing said space elements to form pores in said spaces where said space elements were located.

6. The method of claim 5, wherein said space elements are introduced simultaneously with said coating step.

7. The method of claim 5, wherein said space elements are made of materials selected from the group consisting of ammonium carbonate, wax, synthetic spheres, sawdust, and graphite.

8. A method for producing a porous form body of sinterable silicon carbide, comprising the following steps:
   (a) forming a suspension of sinter-active SiC-powder including free carbon and an additive selected from the group consisting of aluminum and boron, in a solvent including a boding agent,
   (b) forming droplets of said suspension, said droplets having a droplet size larger than a powder particle size,
   (c) partially drying said droplets to form a granular material of substantially spherical granules which are still moist to retain their substantially spherical shape due to said bonding agent,
   (d) adding a plastifier to said substantially spherical granules, said plastifier and said bonding agent being chemically and physically neutral relative to each other, for forming a deformable mass by adding a second solvent that is chemically and physically neutral relative to the bonding agent,
   (e) shaping said deformable mass into a green body, in which said substantially spherical granules stick to each other at surface contact points, and
   (f) further drying said green body until the dried green body, in which said substantially spherical granules still stick to each other, has a sufficient green strength or form stability, and sintering said dried green body for completing said porous form body, wherein said substantially spherical granules form interlinked open ducts due to said surface contact points.

9. The method of claim 8, wherein said shaping step is performed by pressing said deformable mass.

10. The method of claim 8, wherein said step of shaping is performed by slip-casting said deformable mass.

11. The method of claim 8, wherein said solvent is selected from the group consisting of water, suitable organic solvents, and mixtures of water and suitable organic solvents.

12. The method of claim 8, wherein said bonding agent is selected from the group consisting of resins.

13. The method of claim 8, further comprising subjecting said substantially spherical to a heat treatment step for curing or for a preliminary sintering.

14. The method of claim 8, further comprising passing said substantially spherical granules, prior to adding said plastifier, through a screening operation for forming batches of substantially spherical granules having a predetermined size in each batch.

15. The method of claim 8, wherein said plastifier is selected from the group consisting of wax, polyethylene glycol, carboxyl-methyl cellulose, galacto-manose, methacrylate, saccharose, polystyrene, and polyvinyl alcohol.

16. The method of claim 15, wherein said plastifier contains a plastifier solvent selected from the group consisting of water and organic solvents.

17. The method of claim 8, wherein said plastifier is added to said granular material by combining 70 to 79% by weight of sinter-active SiC granular material, 1 to 4% by weight of galacto-manose and 20 to 26% by weight of water.

18. The method of claim 8, wherein said plastifier is added to said granular material by combining to 94 to 97% by weight of sinter-active SiC granular material, 1 to 2% by weight of polyvinyl alcohol and 2 to 5% by weight of water.

19. The method of claim 8, further comprising inserting into said granular material space elements which take up respective spaces in said green body and then heat treating said green body for removing said space elements to form pores in said spaces where said space elements were located.

20. The method of claim 8, further comprising performing at temperatures within the range of about 160° to about 600° C., a bake-out and coking step prior to said sintering step, said bake-out and coking step being performed in a vacuum.

21. The method of claim 8, wherein said step of forming droplets is performed by spraying said suspension through a spraying nozzle to form a spray jet of said suspension, and wherein said step of drying is performed by drying said spray jet.

22. The method of claim 8, wherein said space elements are made of material selected from the group consisting of ammonium carbonate, wax, suitable synthetic spheres, sawdust, and graphite.

* * * * *

UNITED STATES PATENT AND TRADEMARK OFFICE
CERTIFICATE OF CORRECTION

PATENT NO. : 5,001,088
DATED : March 19, 1991
INVENTOR(S) : Holger Hauptmann et al.

It is certified that error appears in the above-identified patent and that said Letters Patent is hereby corrected as shown below:

```
In the Abstract, line 8, after "or" insert --by--;
Column 1, line 64, replace "user" by --under--;
Column 2, line 30, replace ", the" by --. The--;
Column 4, line 4,  replace "carbon said" by --carbon. Said--;
Column 4, line 22, replace "of" (second occurrence) by --on--;
Column 5, line 25, replace "the" (first occurrence) by
                   --these--;
Column 6, line 3 of EXAMPLE 2 should read as follows:
                   --phenolic resin      6.0%(wt.)--;
Column 7, line 34, replace "granule" by --granules--;
Column 8, line 6,  before "synthetic" insert --suitable--;
Column 8, line 14, replace "boding" by --bonding--;
Column 8, line 49, after "resins" insert --and mixture of resins--;
Column 8, line 51, after "spherical" insert --granules--.
```

Signed and Sealed this

Fifth Day of October, 1993

Attest:

BRUCE LEHMAN

*Attesting Officer*  *Commissioner of Patents and Trademarks*